M. S. G. Wilde,
Lawn Mower.

No. 86,960.   Patented Feb. 16, 1869.

Witnesses
Chas. C. Wilde
[signature]

M. S. G. Wilde

UNITED STATES PATENT OFFICE.

MAXIMILIAN S. G. WILDE, OF SOMERVILLE, ASSIGNOR TO HIMSELF AND JAMES H. NOBLE, OF PITTSFIELD, MASSACHUSETTS.

IMPROVEMENT IN LAWN-MOWERS.

Specification forming part of Letters Patent No. 86,960, dated February 16, 1869.

Be it known that I, MAXIMILIAN S. G. WILDE, of Somerville, in the county of Middlesex and State of Massachusetts, have invented new and useful Improvements in Hand-Mowers, of which the following is a full, clear, and exact description, reference being had to the accompanying drawings, making a part of this specification, in which—

Figure 1:
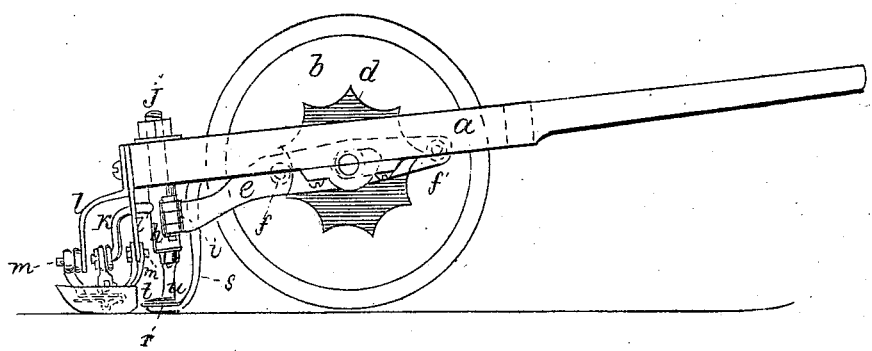
Figure 2:
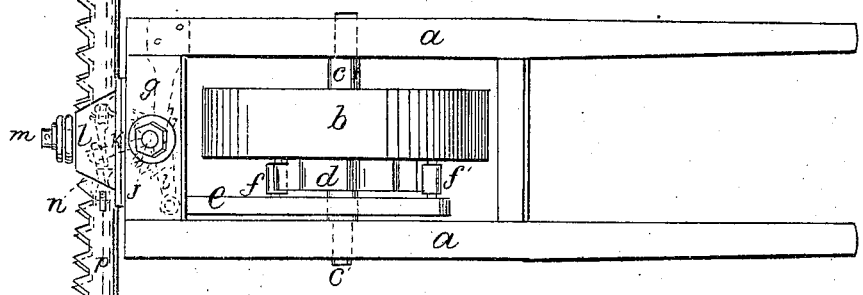
Figure 3:
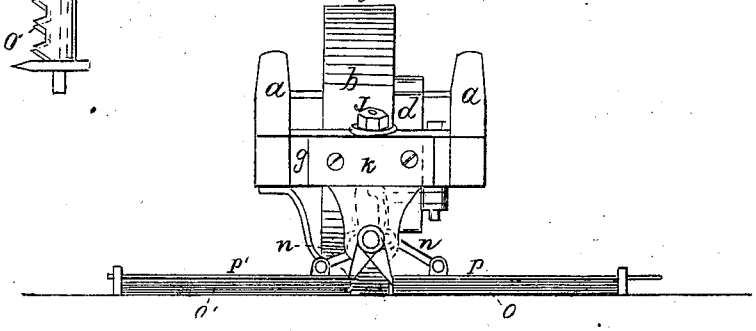

Figure 1 represents a side elevation of the hand-mower containing my invention. Fig. 2 is a plan view, and Fig. 3 is a front view, of the same.

Similar letters indicate like parts in the several figures.

The object of my invention is to produce a time and labor saving hand-mowing machine, which is simple and inexpensive in its construction, cutting grass of various heights, and spreading it evenly upon the ground, and which is also adapted to operate on level and inclined surfaces at the same time, thus providing a much-needed relief to gentlemen farmers, gardeners, small farmers, &c., for facilitating and speeding the work, and for keeping their grounds neatly and well trimmed; and My invention consists in securing two sickle-bars, on which the cutters vibrate by means of pivots, to plates attached to the frame of the machine, in such a manner that they move independently from one another, that they can be placed under any suitable angle to each other, and, further, that said sickle-bars adjust themselves to the nature of the ground, so that when one of the bars moves on level ground, the other may slide on an incline, as on lawns, embankments around dwellings, and along railroads, &c.

My invention consists, also, in so constructing the arm of a bell-crank that the crank-pin which gives motion to the two cutters sliding on the sickle-bars vibrates in a horizontal plane which passes through the axes of the two pivots of the sickle-bars.

My invention consists, further, in making the sickle-bars of very light metal, and in giving them the proper strength, either by doubling them, or in providing them with one or more corrugations in the direction of their length; and my invention consists in applying an elastic vibrating cutter, moving over an elastic segment, which is provided with teeth, for the purpose of cutting the grass which may be left uncut at the junction of the two sickle-bars.

Referring to the drawings, $a$ $a$ is the frame, which is supported by the wheel or roller $b$. To one side of the latter is attached the cam-wheel $d$, giving a reciprocating motion to the sliding bar $e$, which is provided with two rollers or pins, $f f'$.

The cam-wheel $d$ has an uneven number of elevations and depressions, so that when one of the rollers, $f$, is moved to the forward end of the machine, the other roller, $f'$, will drop into the opposite depression, &c. In this manner a reciprocating motion is secured without the use of springs to force the bar back. The sliding bar $e$ is also provided with a slot, through which the axle $c'$ of the wheel $b$ passes, thus supporting the bar $e$, and giving it play to follow the workings of the cam-wheel.

The forward end of the sliding bar $e$ is fastened to the arm $i$ of the bell-crank $h$, the latter being secured to the cross-bar $g$ by the bolt $j$. The other arm, $k$, of the bell-crank $h$ projects forward, and operates the connecting-rods $n$ $n'$, for shifting the cutters $p$ $p'$.

To the cross-bar $g$ are attached the plates $l$ $l'$, which, with their lower portions, support, by means of pivots $m$ $m'$, the two sickle-bars $o$ $o'$.

The rear portion of the sickle-bars $o$ $o'$ is bent or doubled, or it may be corrugated, for the purpose of combining strength with lightness of material.

Underneath the bell-crank $h$ is a stationary toothed segment, $r$, which is secured to the frame by spring $s$. The tendency of the latter is to press the segment $r$ slightly against the ground, and still yielding sufficiently to pass the segment over uneven ground. On this segment $r$ vibrates the cutter $t$, which is firmly attached to the bell-crank by an elastic connection, $u$, and thus receives its vibrating motion. The object of this last-named cutter is to cut off all the grass which may be left standing by the operation of the sickle-bars and cutters.

I do not confine myself to two sickle-bars suspended on pivots, and extending on either side of the machine in a vertical plane; but one of the sickle-bars may be arranged for ward of the other, and both may have their inner ends extended beyond the center line of the machine, in which case the vibrating cutter $t$ may be dispensed with, or they may be placed at an angle to the center line.

What I claim as new, and desire to secure by Letters Patent, is—

1. The combination of the finger-bars $p\ p'$, links $n\ n'$, and vibrating crank, arranged and operating as set forth.

2. The combination of the sickle-bars $o\ o'$, connections $m\ m'$, and vibrating arm $k$, arranged and operating substantially as described.

3. The combination of an elastic sickle-segment and vibrating cutter with two sickle-bars and cutters, as and for the purpose specified.

In testimony whereof I have signed my name to this specification in the presence of two subscribing witnesses.

MAXIMILIAN S. G. WILDE.

Witnesses:
WILLIAM DENNISON,
CHAS. O. WILDE.